H. H. TURNER.
TRAP.
APPLICATION FILED OCT. 26, 1907.

1,041,911.

Patented Oct. 22, 1912.

WITNESSES:
Brennan B. West
Nathan H. Fretter

INVENTOR,
Henry H. Turner,
By Bates, Fouts & Hull
Attorneys.

COLUMBIA PLANOGRAPH CO., WASHINGTON, D. C.

UNITED STATES PATENT OFFICE.

HENRY H. TURNER, OF ROCHESTER, NEW YORK.

TRAP.

1,041,911. Specification of Letters Patent. Patented Oct. 22, 1912.

Application filed October 26, 1907. Serial No. 399,245.

*To all whom it may concern:*

Be it known that I, HENRY H. TURNER, residing at Rochester, in the county of Monroe and State of New York, have invented a certain new and useful Improvement in Traps, of which the following is a full, clear, and exact description, reference being had to the accompanying drawings.

This invention relates to traps which are employed with bath tubs, basins, etc. for the purpose of preventing access of noxious gases from the sewer connection to the compartment wherein the tub or basin may be located. The universal manner of connecting such traps into the waste pipes from bath tubs and the like is by means of wiped joints at the junction of the trap and the waste pipe and sewer connection, but this expedient necessitates the delay and expense of wiping the joint and the employment of expensive metal in the waste pipe.

One of the objects of my invention is to provide a trap wherewith a pipe of iron or relatively cheap material may be employed and to which it may be connected without the necessity for such delay and expense.

A further object of the invention is to provide a trap which, while extremely cheap of production, possesses marked advantages over the traps now employed in the art. I accomplish these results by the construction illustrated in the accompanying drawings, wherein—

Figure 1:
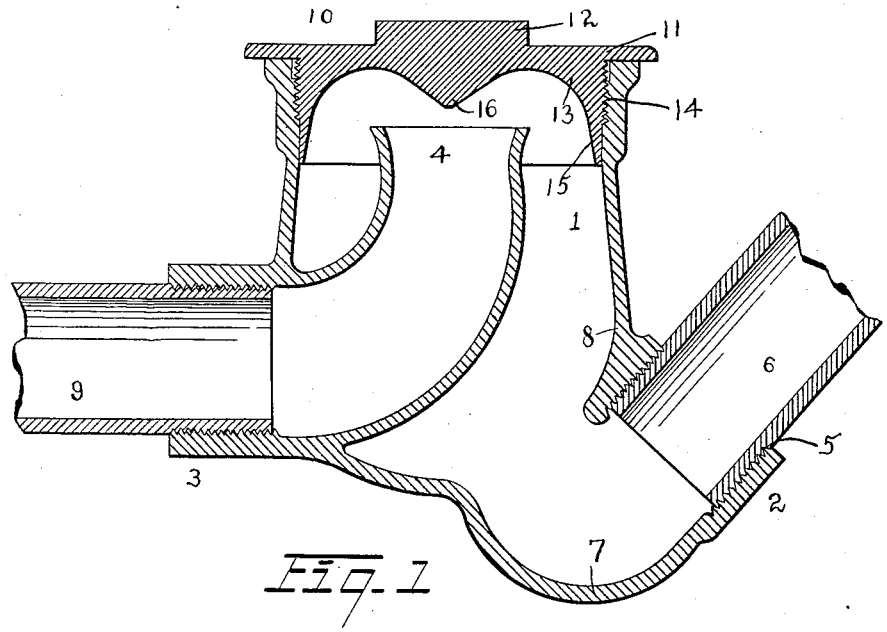
Figure 2:
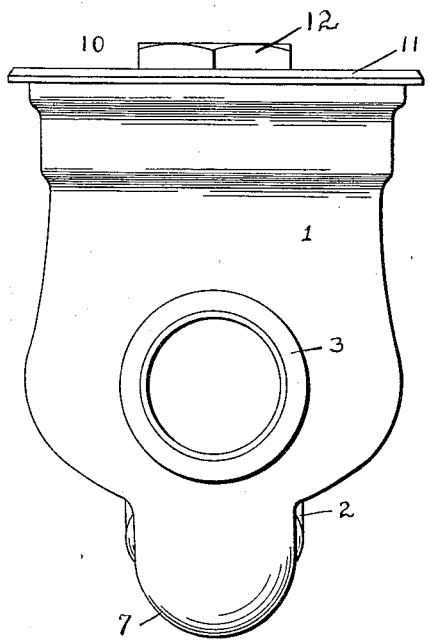

Figure 1 represents a central vertical sectional view taken through a trap constructed in accordance with my invention, and Fig. 2 represents an elevation of such trap taken from the left hand of Fig. 1.

Generally speaking, the invention may be defined as consisting of the combinations of elements embodied in the claims hereby annexed.

Describing the parts by reference characters, 1 represents the trap generally, the same being cheaply and preferably formed from a hollow casting of iron or other cheap metal, having formed therewith an inlet connection 2, an outlet connection 3, and a stand-pipe 4.

The inlet connection 2 projects at an angle of about 45 degrees from the bottom of the trap casing and is provided with an internal standard thread 5, to which a waste pipe 6 of iron or similar metal may be fitted, by being threaded thereinto. The inlet 2 merges with the bottom of the trap, the lower wall of the inlet being concavely curved on the inside thereof, as shown at 7, to prevent the adherence of any solid material thereto and also to impart a whirling motion to the water discharged into the body of the trap.

As will appear from the drawing, the lower portion of the trap is somewhat enlarged and is internally concaved, as shown at 8, whereby the water flowing through the trap will continue to be agitated or whirled on its way to the top of stand-pipe 4, thus preventing any solid materials from adhering to the wall of the trap or the stand-pipe. The stand-pipe 4 is also cast with the body of the trap, forming an extension of outlet 3. This outlet is provided with a standard thread for the reception of a corresponding external thread on the sewer connection 9, which may also be of iron or other cheap metal.

With the trap thus described, I employ a special form of cover 10. This cover is provided with a flat top 11 having formed therewith a nut 12 and being provided with an integral skirt 13. This skirt is provided with an external thread 14 adapting the connection to be threaded into the top of the trap body, and the skirt is extended downwardly below the threaded portion for a considerable distance and below the top of the stand-pipe 4. This projection of the lower end of skirt 15 below the top of stand-pipe 4 provides a water seal between the cover of the trap and any gases that may accumulate thereunder in addition to the regular seal which is provided between the top of stand-pipe 4 and the inlet connection 2. Cover 10 is provided with a central depending conical projection 16, arranged centrally above the upper end of stand-pipe 4 and spaced a short distance from the top of said pipe. The interior of the cover is concavely curved from the lower end of the skirt to the conical projection, thereby forming a guide for any dirt or other solid material that may enter the trap and so guiding it that it must reach the open end of stand-pipe 4 and be discharged by said pipe through the outlet.

It will be observed that the upper end of the stand-pipe 4 is flared, producing a flaring mouth which, in combination with the conical projection 16, secures uniform discharge through the outlet pipe and will enable the trap to be readily and completely cleared out, and furthermore the enlarged rounded bottom of the trap facilitates the removal of sediment, particularly sediment composed of heavy material.

The inclination of the inlet 2 at an angle of 45 degrees facilitates the application of pipe 6 thereto and, with the curved extension 7 of the lower end of said inlet, assists in imparting a stirring or whirling motion to the water conducted into the trap to prevent the accumulation of any sediment on the interior thereof.

By providing the inlet connection 2 at the bottom of the trap and connecting the inlet pipe 6 therewith, I am enabled to maintain a perfect seal in the trap with the use of a very small amount of water therein.

The formation of the outlet 3 in the side wall of the trap is of considerable advantage in that it does away with the necessity for a curved waste pipe, which is always an added expense in the manufacture, and also obviates the necessity for the extra connectors between the trap and the main waste pipe which are now in common use in the art. Again, the cost of production is reduced in that the amount of metal required is much less where the stand pipe is short because it extends from the side wall instead of from the bottom of the trap. However, the shortening of the stand pipe will not affect the seal at the top thereof, because the relative distance between the top of the trap and the top of the stand pipe is the same as in the ordinary constructions.

From the above description, it will be apparent that I have produced a trap wherein the operation of attaching the inlet and outlet pipes may be performed without the expense of wiping joints, which is extremely cheap of production, and which will maintain an effective seal between the gases which may accumulate therein and the compartment in which the trap will be located.

Having described my invention, I claim:

1. A trap comprising a hollow body having an inlet and an outlet connection, a stand-pipe communicating with the outlet connection, and a removable cover for said trap, said cover being provided with an internal flange or skirt projecting below the top of the stand-pipe, substantially as specified.

2. A trap comprising a hollow body having an inlet and an outlet connection, a stand-pipe communicating with the outlet connection, and a cover for said trap, said cover being provided with a skirt having a thread thereon by means of which it may be fitted to the top of the trap body, said skirt projecting below the top of the stand-pipe, substantially as specified.

3. A trap comprising a hollow body having an inlet and an outlet connection, a stand-pipe communicating with the outlet connection, and a cover for said trap, said cover being provided with a skirt having a thread thereon by means of which it may be fitted to the top of the trap body, said skirt having a plain or unthreaded lower end projecting below the top of the stand-pipe, substantially as specified.

4. A trap comprising a hollow body having an inlet and an outlet connection, a stand-pipe communicating with the outlet connection, and a cover for said trap, the interior of said cover being provided with a conical projection located above the central portion of the stand-pipe, a concave annular space being provided between said conical portion of the cover and the side thereof, substantially as specified.

5. A trap comprising a hollow body having an inlet and an outlet connection, a stand-pipe communicating with the outlet connection and having a centrally arranged upper end, and a cover for said trap provided with a central downwardly extending conical projection, the interior of said cover being concave outside of said projection, substantially as specified.

6. A trap for the purpose specified comprising a hollow body having an inlet and an outlet connection, a stand-pipe communicating with the outlet connection and having its upper end arranged centrally with respect to the body, said body also having the inner surface of the top thereof concavely curved with a downwardly extending conical projection located above the central portion of the top of the stand-pipe, substantially as specified.

7. A trap comprising a hollow body having an inlet and an outlet connection, a stand pipe extending upwardly from the outlet connection beneath the top of the trap and provided with an upwardly directed flared mouth, said trap having at its upper end a downwardly extending conical projection located above the central portion of the mouth of the stand-pipe.

8. A trap comprising a body having cast therewith an upwardly directed threaded inlet connection projecting from the lower portion thereof, and a laterally threaded outlet connection located below the top in a wall opposite the inlet connection, and a stand-pipe extending upwardly from the outlet connection and terminating below the top of the trap, said body having the inner surface of its top concavely curved with a downwardly extending conical projection located above the central portion of the top of the stand pipe, and the upper portion of said stand pipe being outwardly flared.

In testimony whereof, I hereunto affix my signature in the presence of two witnesses.

HENRY H. TURNER.

Witnesses:
E. H. GILMAN,
HARRY N. R. GLOVER.

Copies of this patent may be obtained for five cents each, by addressing the "Commissioner of Patents, Washington, D. C."